United States Patent [19]

Obermeyer

[11] Patent Number: 5,642,963

[45] Date of Patent: Jul. 1, 1997

[54] SPILLWAY GATE SYSTEM

[76] Inventor: Henry K. Obermeyer, 303 W. County Rd. 74, Wellington, Colo. 80549

[21] Appl. No.: 519,046

[22] Filed: Aug. 24, 1995

[51] Int. Cl.$^6$ ....................................... E02B 5/08
[52] U.S. Cl. .............................. 405/100; 405/87; 405/84; 405/108
[58] Field of Search ...................... 405/115, 84–86, 405/87–92, 98, 99, 107–108, 102

[56] References Cited

U.S. PATENT DOCUMENTS

| | | | |
|---|---|---|---|
| 4,729,692 | 3/1988 | Tucker | 405/107 |
| 4,780,024 | 10/1988 | Obermeyer et al. | 405/115 |
| 5,092,707 | 3/1992 | Obermeyer | 405/115 X |
| 5,310,284 | 5/1994 | Snowberger | 405/102 |

*Primary Examiner*—Tamara L. Graysay
*Assistant Examiner*—Frederick Lagman
*Attorney, Agent, or Firm*—Dean P. Edmundson

[57] ABSTRACT

A spillway gate system for use as a navigation dam in which individual spillway gates may be serviced. The spillway gate system comprising a spillway including abutments at opposite ends thereof; wherein at least one of the abutments includes a cavity therein having a bottom surface; a removable bulkhead covering the cavity in the abutment; a plurality of water control gates hinged to the spillway; a service crane movable along the spillway and including a dewatering caisson; and a seal for sealing the caisson to the gates and to the bottom surface of the cavity.

3 Claims, 21 Drawing Sheets

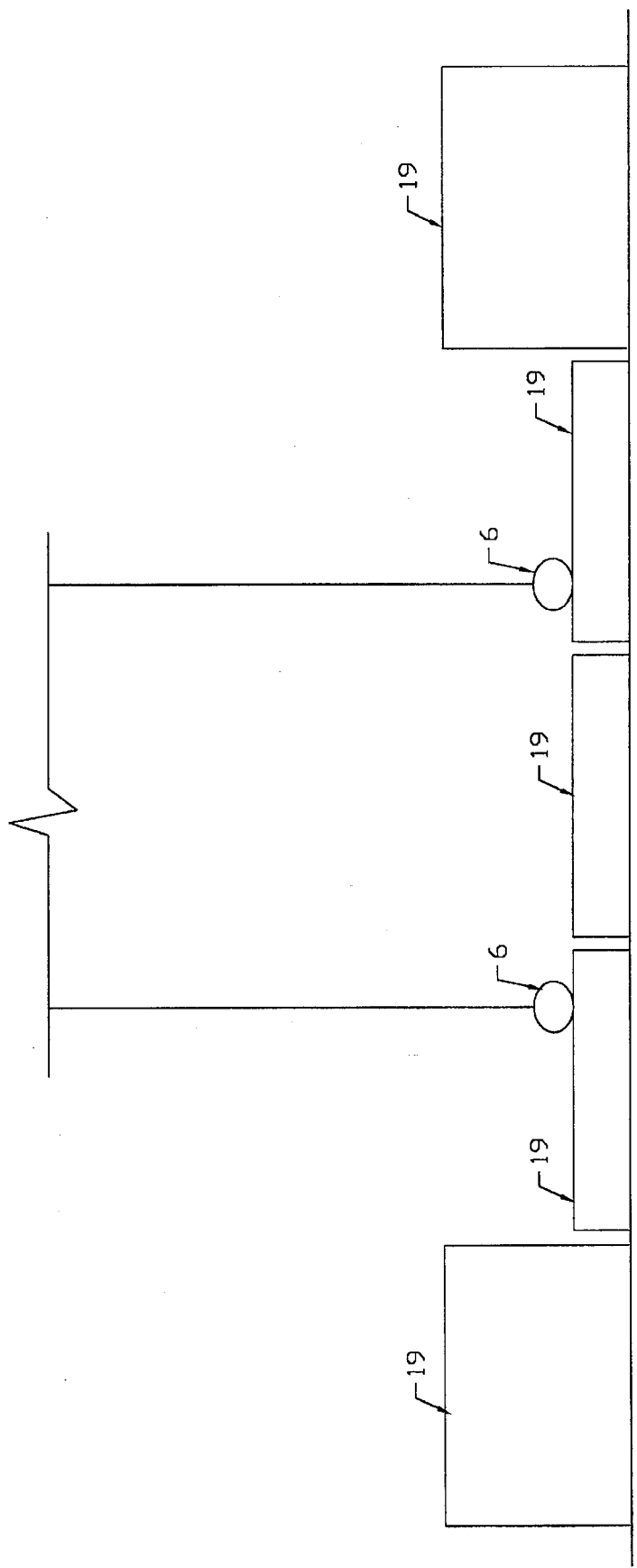

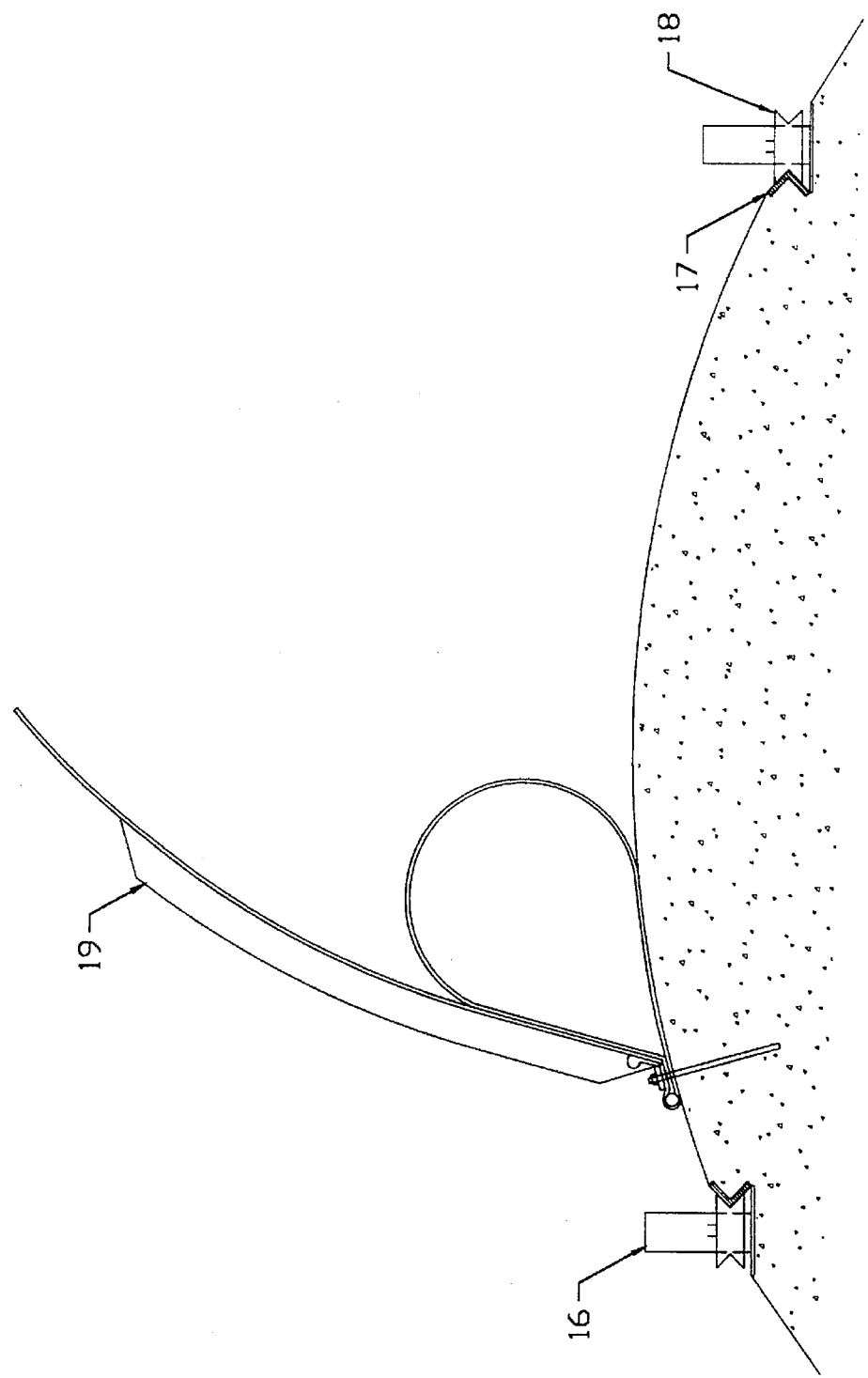

5,642,963

SPILLWAY GATE SYSTEM

FIELD OF THE INVENTION

This invention relates to gated spillways such as those used for navigation dams and the associated means of servicing individual spillway gates. More particularly, this invention relates to the design of a service crane which can dewater and service all of the gates on a spillway including those nearest each abutment.

BACKGROUND OF THE INVENTION

Service cranes are known for use on gated dam spillways. Most large navigation dams incorporate an overhead bridge mounted crane which is used to place dewatering bulkheads and lift gate system components. In order to minimize the need for complete dewatering of individual gates, tainter gates which are hinged above the downstream waterline are frequently used. Bulkhead slots are provided either upstream only or both upstream and downstream to permit dewatering. Such installations are extremely expensive in large part because of the need for piers and an overhead craneway.

Simple mechanical wickets which are operated from a work boat have a lower initial cost than the tainter gate installations, but are labor intensive to operate. Service for such mechanical wickets, if required, is provided by a boat positioned caisson.

Bottom hinged hydraulic gates can be installed without piers. In this case, it is required that a large area be dewatered without the benefit of piers should the gates require maintentance.

Pneumatic spillway gates such as those described in U.S. Pat. No. 4,780,024 and U.S. Pat. No. 5,092,707 can be economically made in shorter lengths than hydraulic gates, resulting in a smaller size of dewatered area being required for servicing the gates.

SUMMARY OF THE PRESENT INVENTION

In accordance with the present invention there is provided an improved gated spillway comprising a concrete spillway with a plurality of bottom hinged gates mounted thereon, a service crane which incorporates a dewatering caisson, and abutments with removable bulkheads at each end to which the endmost gates seal while in the raised position. The service crane rides on guides or rails which are integral with or mounted directly to the concrete spillway. The removable bulkheads cover extensions of the spillway to which the lower edge of the caisson can seal. The extensions of the spillway preferably have profiles which are identical to the profile of the top surface of the lowered spillway gates. The individual gates are configured to seal to the spillway and minimize lateral water leakage under adjacent gates into the dewatered caisson when the caisson is being used to dewater a gate requiring inspection or service. One or both of the removable bulkheads may enclose a docking station where the service crane can be parked out of the way of navigation traffic and water borne debris.

In one embodiment of the invention, the service crane caisson would be fixed to the crane structure and would incorporate a movable sealing means such as an inflatable seal which would be used to seal to the lowered gates and to the spillway surface immediately upstream and downstream of the gates.

In another embodiment of the invention, the service crane caisson would be movable vertically either as a whole or in parts in order to accomplish a seal to the lowered gates and spillway extension.

In another embodiment of the invention, the service crane would incorporate means such as ducted water jets which could be used to clear sediment from the crane trackways and the area under the caisson seal including the top surfaces of the gates and the spillway surfaces immediately upstream and downstream of the gates.

BRIEF DESCRIPTION OF THE DRAWINGS

The invention is described in more detail hereinafter with reference to the accompanying drawings, wherein like reference characters refer to the same parts throughout the several views in which:

FIG. 12 is an elevation view facing upstream showing the crane centered over three lowered gates with other gates raised;

FIG. 13 shows one embodiment of the crane guide system;

FIG. 19 is a sectional elevation of the upstream craneway showing the water flow path thereover.

DETAILED DESCRIPTION OF THE INVENTION

Spillway gate systems which include the unique service crane arrangement of this invention are comprised of mutiple bottom hinged spillway gates. A preferred spillway gate construction is described in application Ser. No. 08/490,643, filed Jun. 15, 1995 still pending, and a subsequent pending application Ser. No. 08/518,620, filed Aug. 23, 1995, both incorporated herein by reference.

Figure 1:
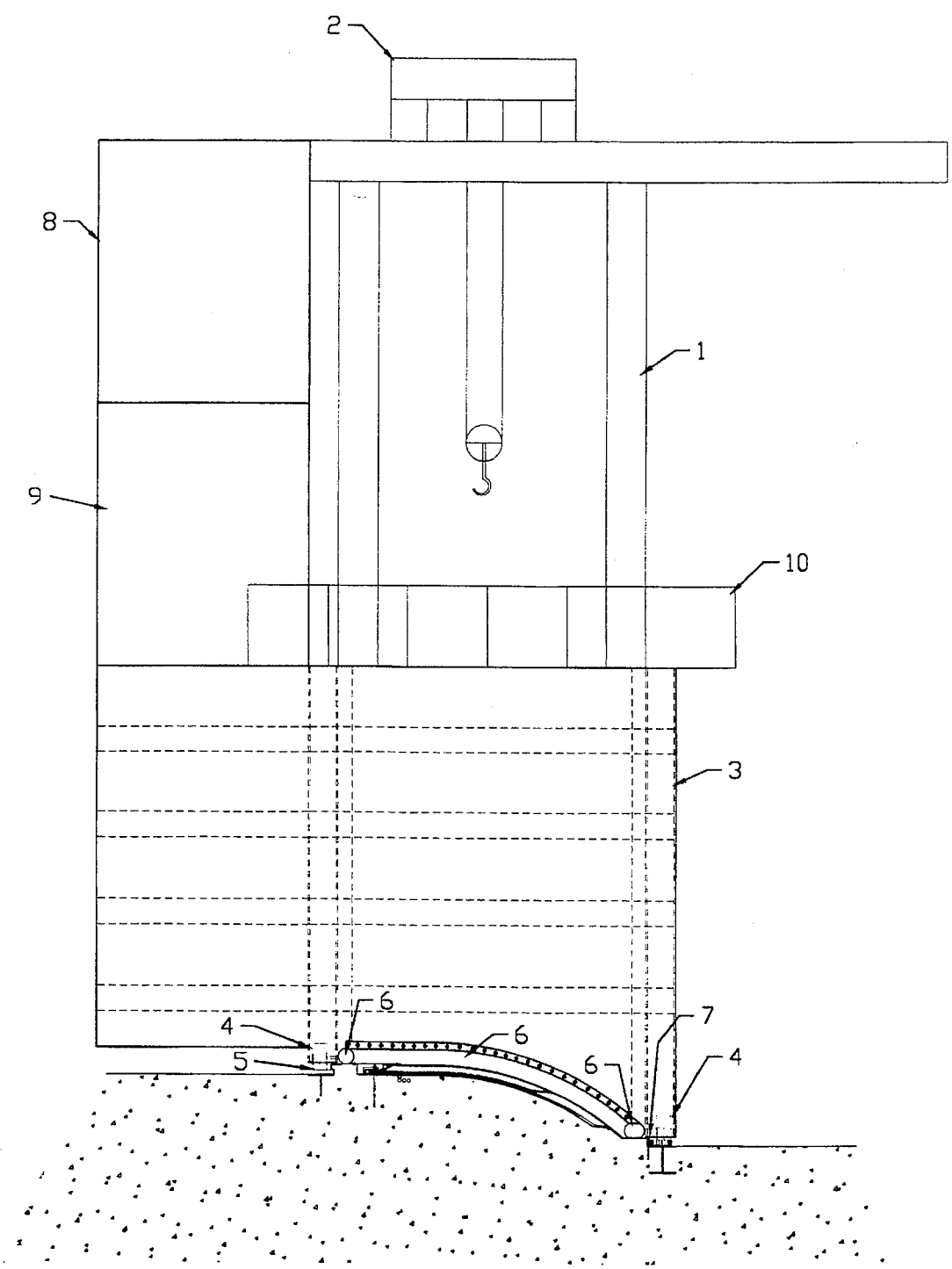
FIG. 1 is an elevation view of the service crane positioned over a lowered gate on the spillway.
Figure 2:
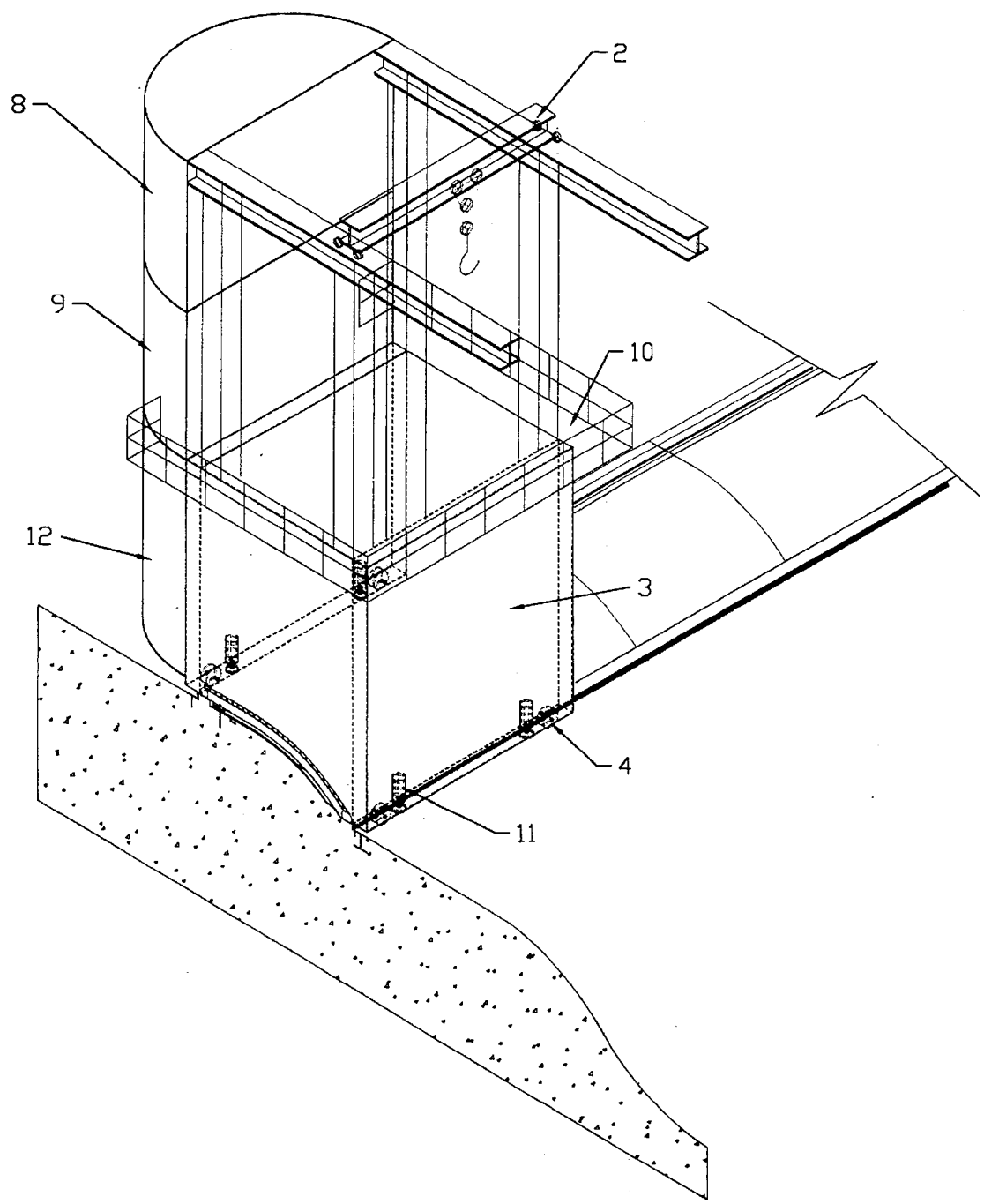
FIG. 2 is a perspective view of the service crane shown in FIG. 1.

FIGS. 1 and 2 show a spillway gate service crane positioned over a gated spillway. The service crane 1 includes a conventional overhead crane 2, a watertight caisson 3, support wheels 4, an upstream guide wheel 5, an inflatable seal 6, a rack fixed to the spillway for service crane positioning, a watertight engine room 8, a storage area 9, and a work platform 10. Dewatering pumps would be included but are not depicted on the drawings. Drive pinion assemblies 11 are shown in FIG. 2. An upstream faring 12 reduces flow induced forces on the structure.

Figure 3:
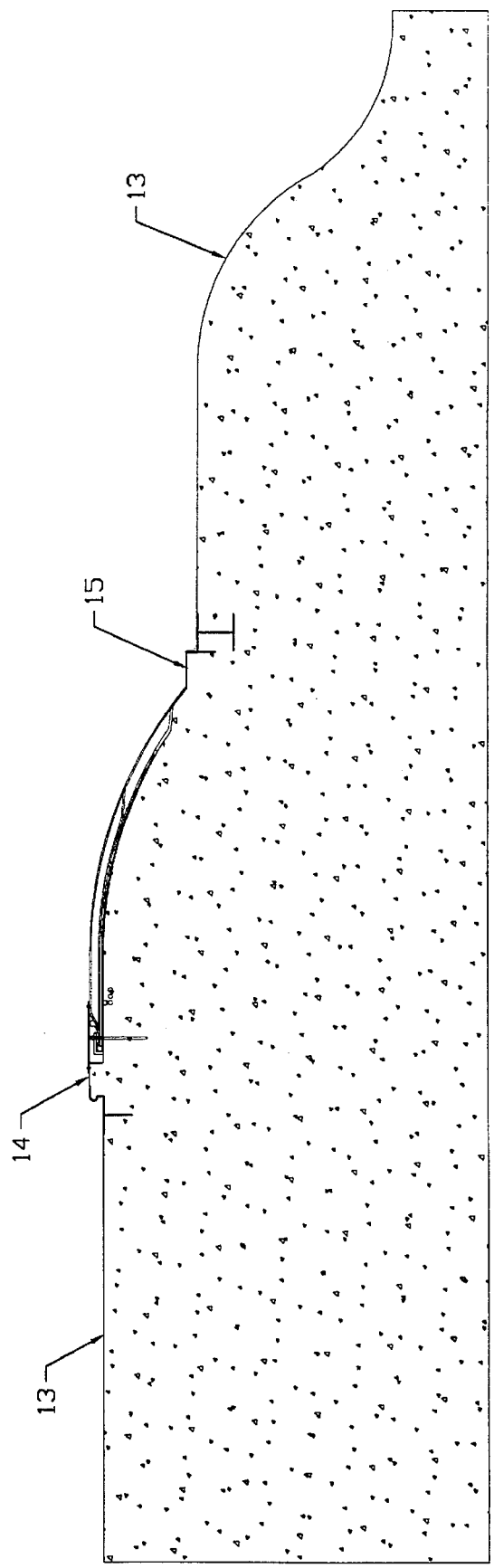
FIG. 3 is a sectional elevation view of the entire spillway.

FIG. 3 shows the spillway 13 without the service crane 1. A sealing surface 14 is provided on the spillway upstream of the gates and a sealing surface 15 is provided downstream of the gates to permit the caisson to seal to the spillway.

Figure 4:
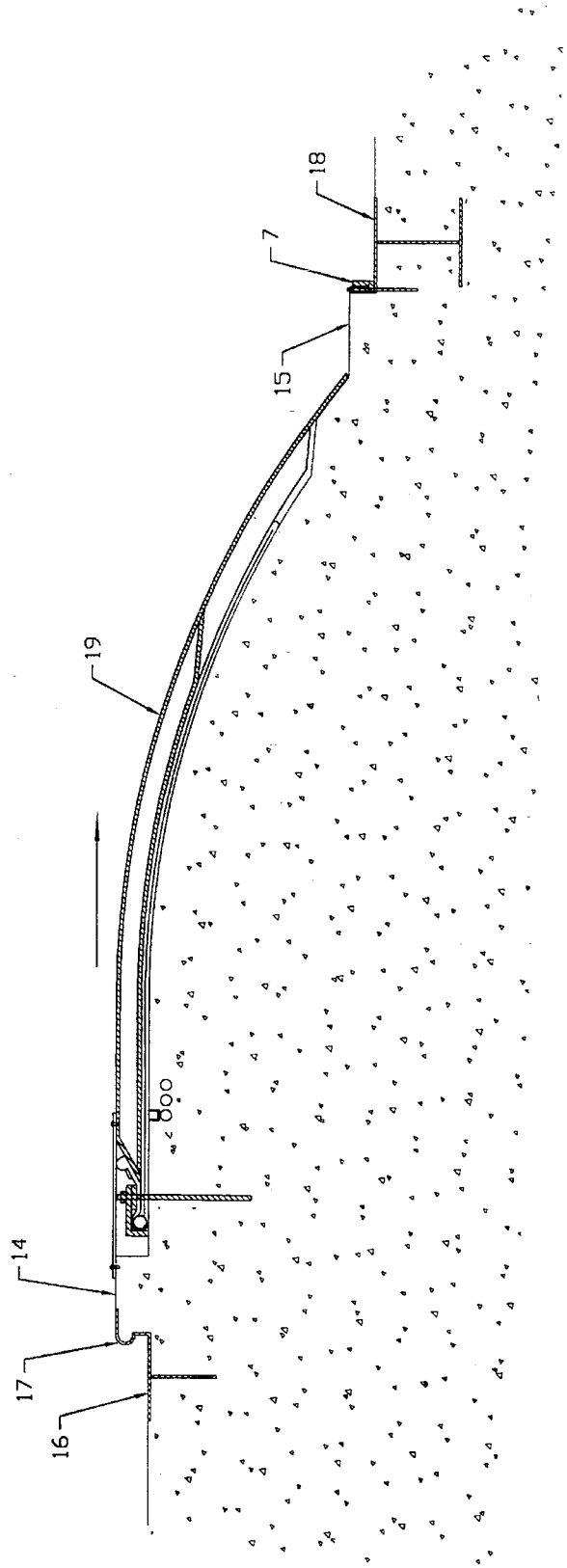
FIG. 4 is an enlarged view of the gate shown in FIG. 3.
Figure 5:
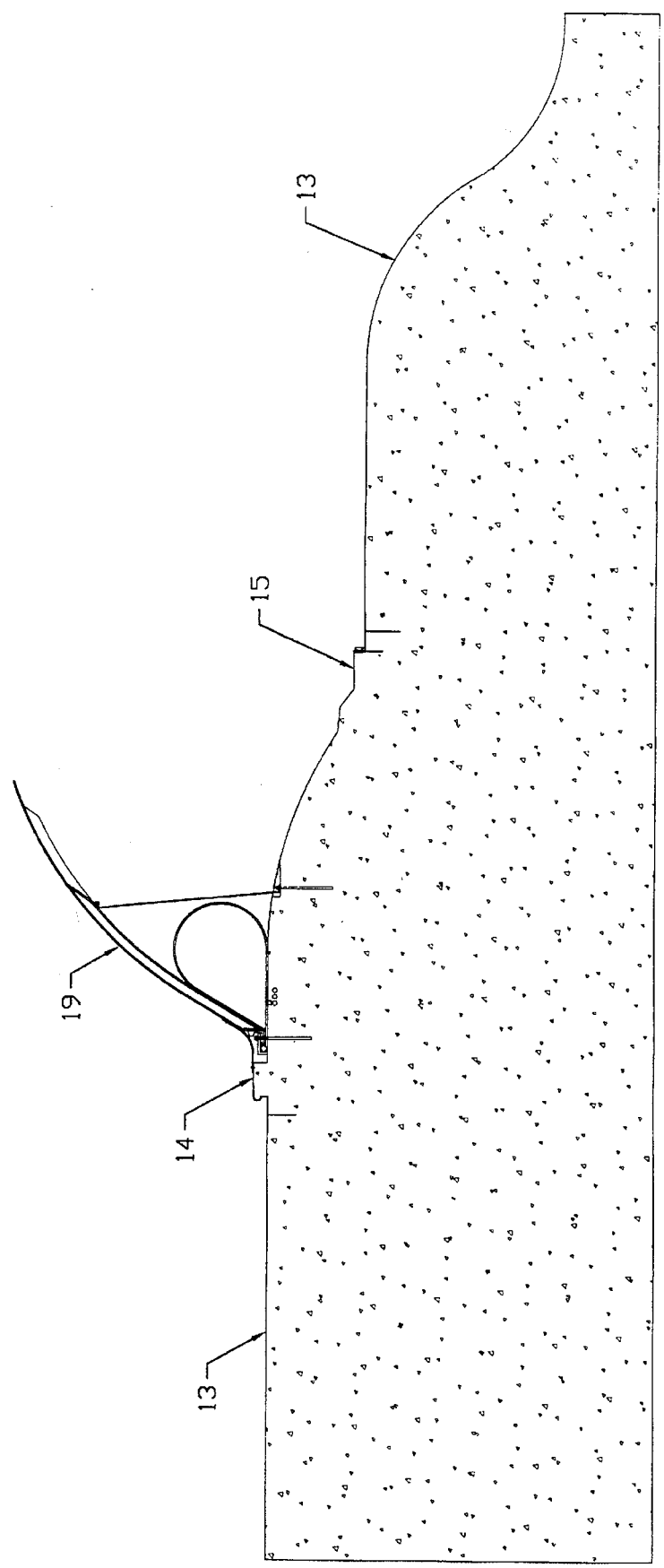
FIG. 5 is a view of the gate of FIG. 4, shown in the raised position.

FIG. 4 illustrates the details of the relationship between the upstream craneway 16, the upstream guide rail 17, the spillway gates 19, the positioning rack 7, and the downstream craneway 18. FIG. 5 illustrates the same system except with the gates 19 in the raised position.

Figure 6:
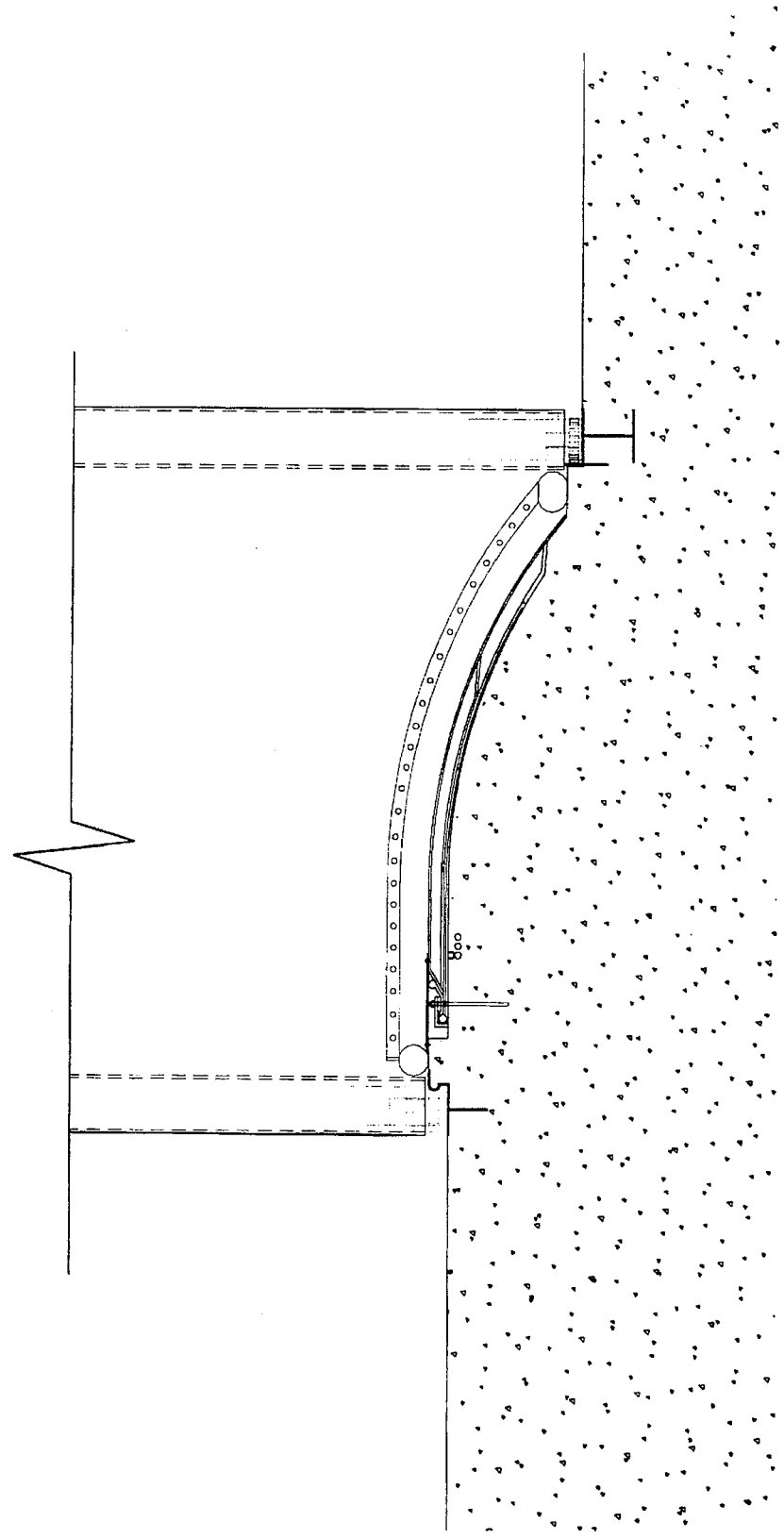
FIG. 6 is a detail of an inflatable seal and wheel assembly of the service crane.

FIG. 6 illustrates the position of the inflatable seal 6 relative to the gates 19.

Figure 7:
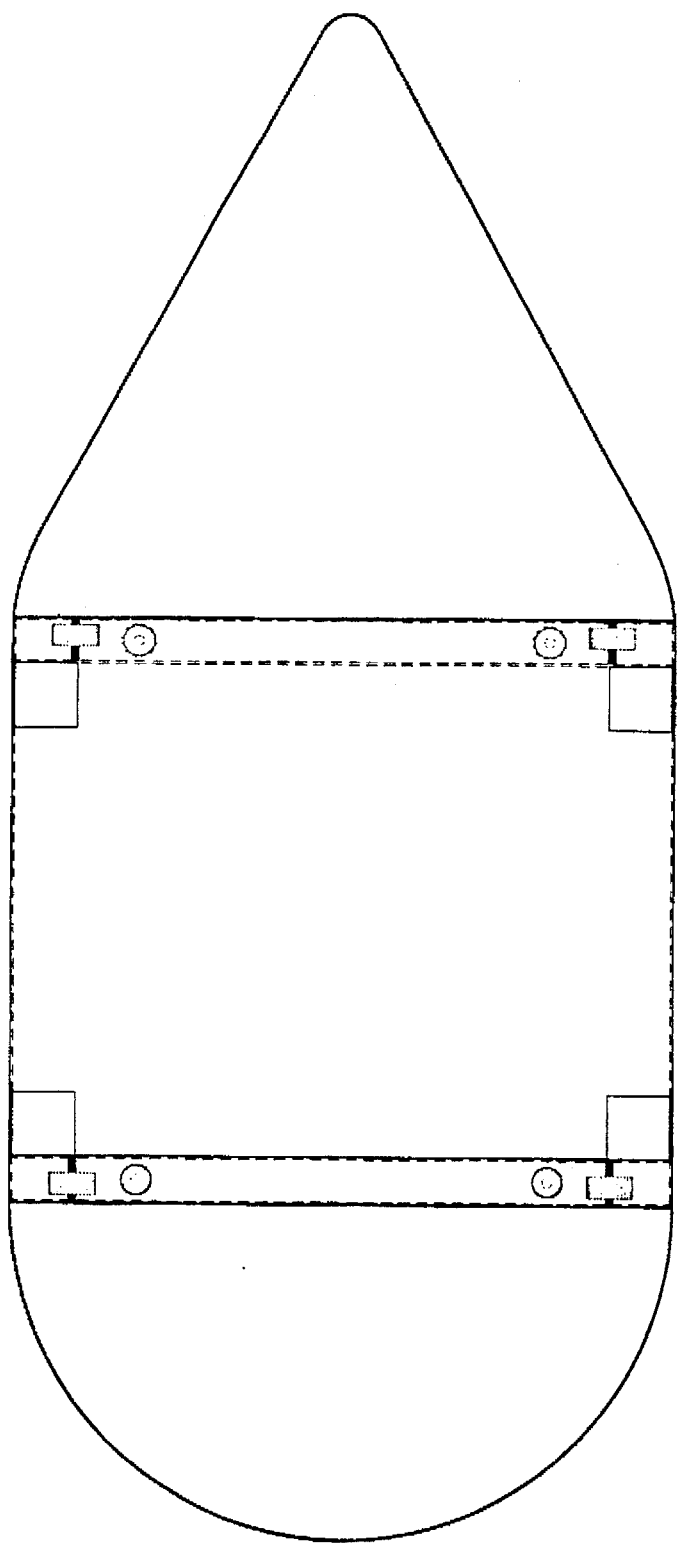
FIG. 7 is a plan view of one embodiment of the service crane.

FIG. 7 illustrates one embodiment of the caisson hull designed to minimize flow induced forces on the service crane.

Figure 8:
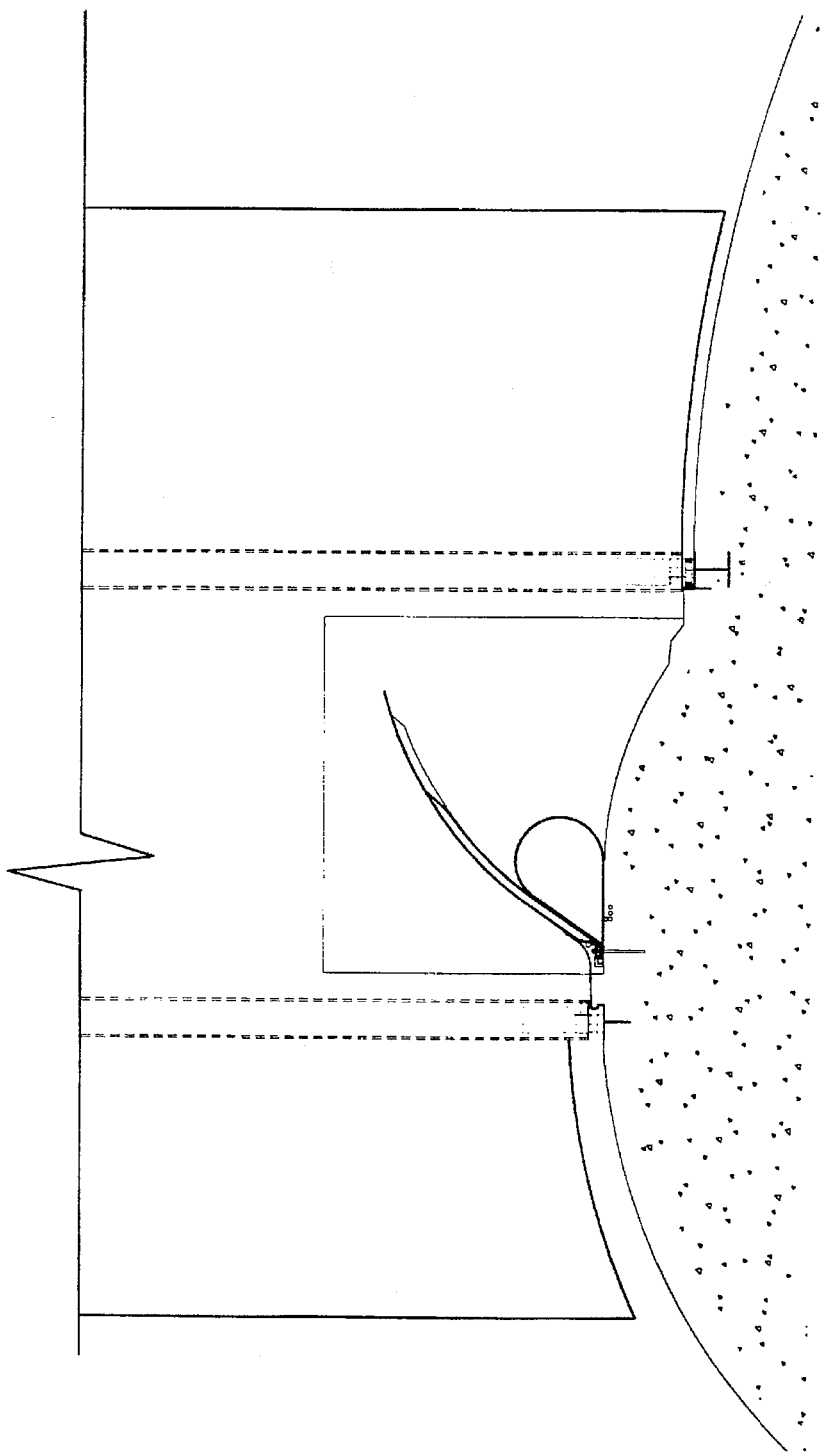
FIG. 8 is an elevation view of the right side of the service crane showing an optional opening for straddeling raised gates and the boat shaped outer hull.

FIG. 8 illustrates the use of optional closable penetrations in the caisson which allow the service crane to move across raised gates.

Figure 9A:
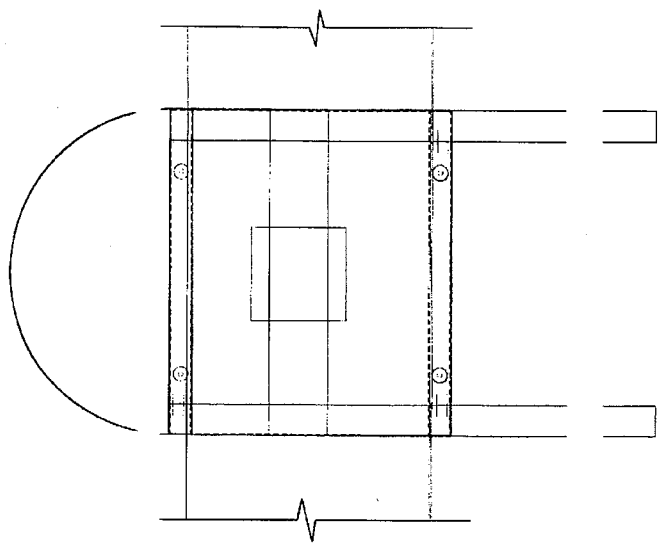
FIG. 9a is a plan view of the arrangement show in FIG. 9.
Figure 9:
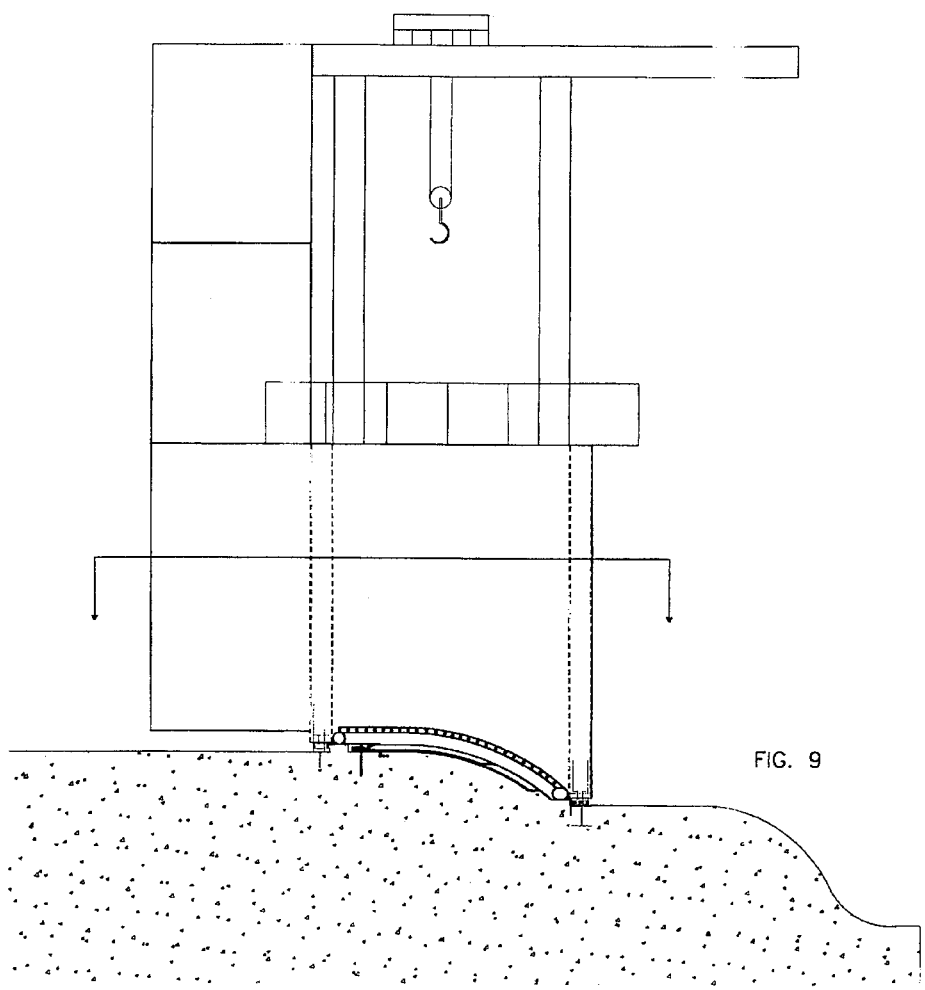
FIG. 9 is an elevation section of the service crane showing a watertight engine room.

FIG. 9 showns a hull and craneway arrangement which facilitates loading equipment by crane to and from a work boat.

Figure 10:
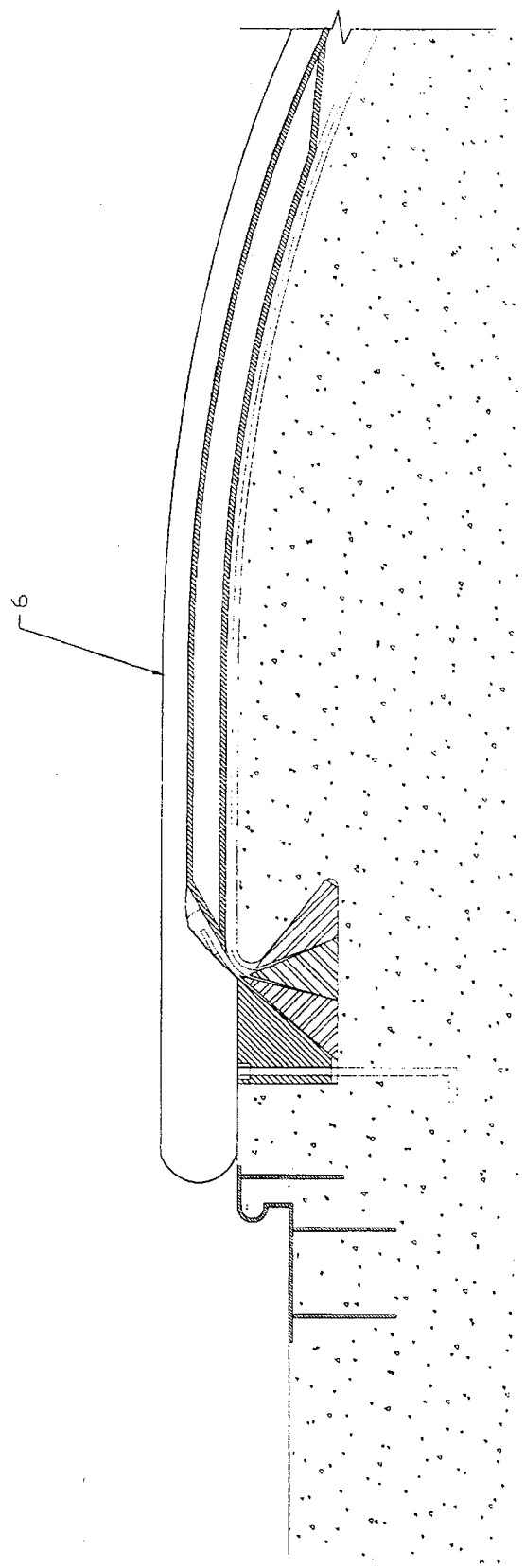
FIG. 10 is a sectional elevation of the upstream craneway.

FIG. 10 shows in one embodiment, the position of the inflatable seal over the upstream hinge portion of the gates 19.

Figure 11:
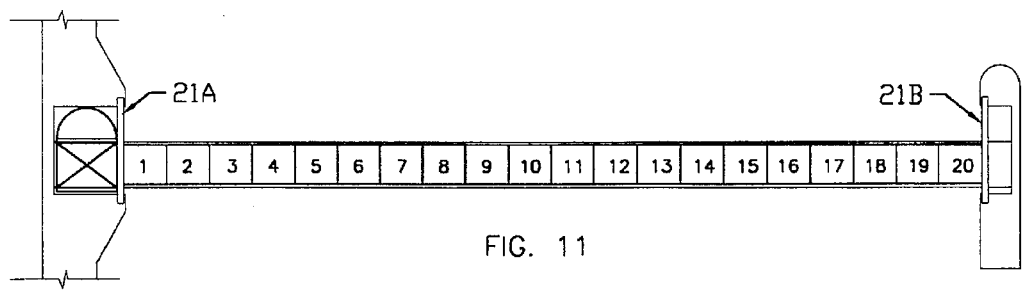
FIG. 11 is a plan view of an entire spillway showing the relative positions of the gates, the crane and the abutment bulkheads, with the crane shown in the stored position.

FIG. 11 shows the service crane in a docked storage position in the prefferred embodiment of this invention.

Figure 11A:
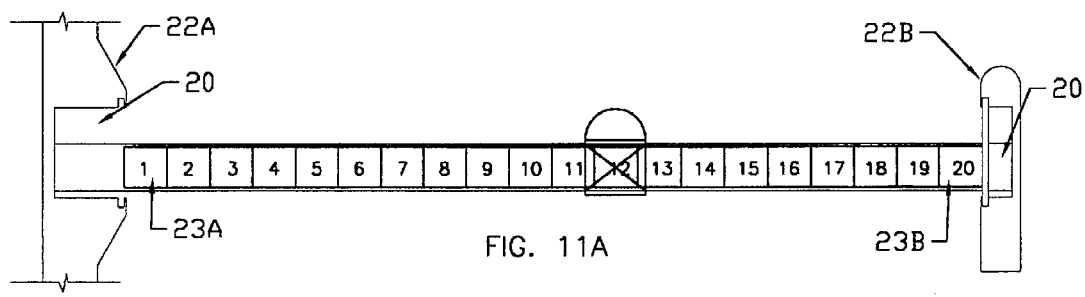
FIG. 11a is the same view as FIG. 11 except with the crane positioned to service the twelfth gate.
Figure 11B:
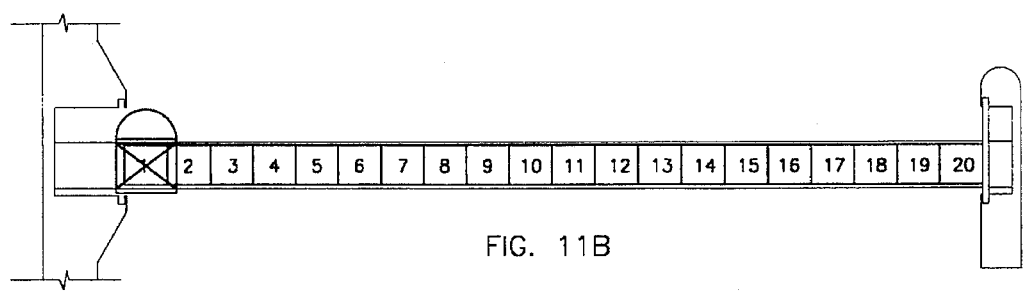
FIG. 11b is the same view as in FIG. 11 except with the crane positioned to service gate number 1.
Figure 11C:
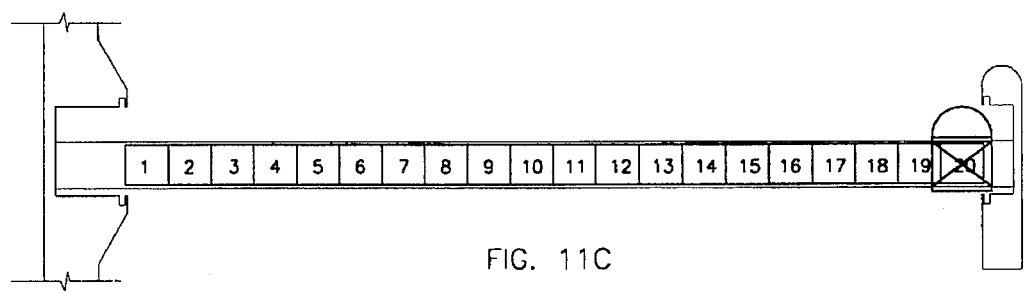
FIG. 11c is the same view as in FIG. 11 except with the crane positioned to service gate number 20.

FIGS. 11a, 11b and 11c show the method by which the service crane is positioned over the various individual spillway gates.

Figure 12A:
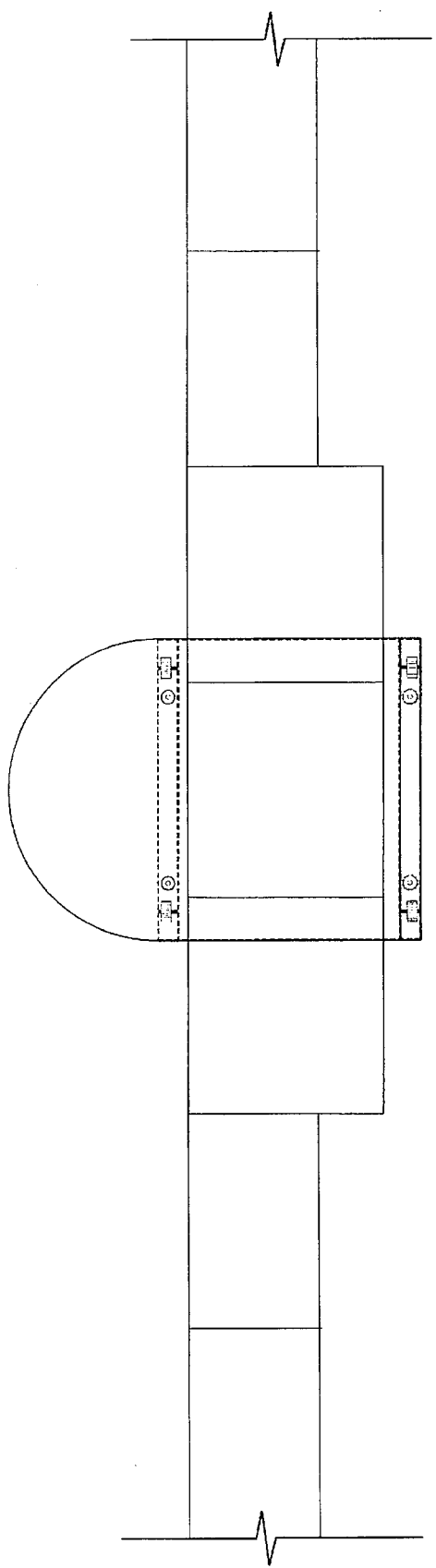
FIG. 12a is a plan view of FIG. 12.
Figure 14:
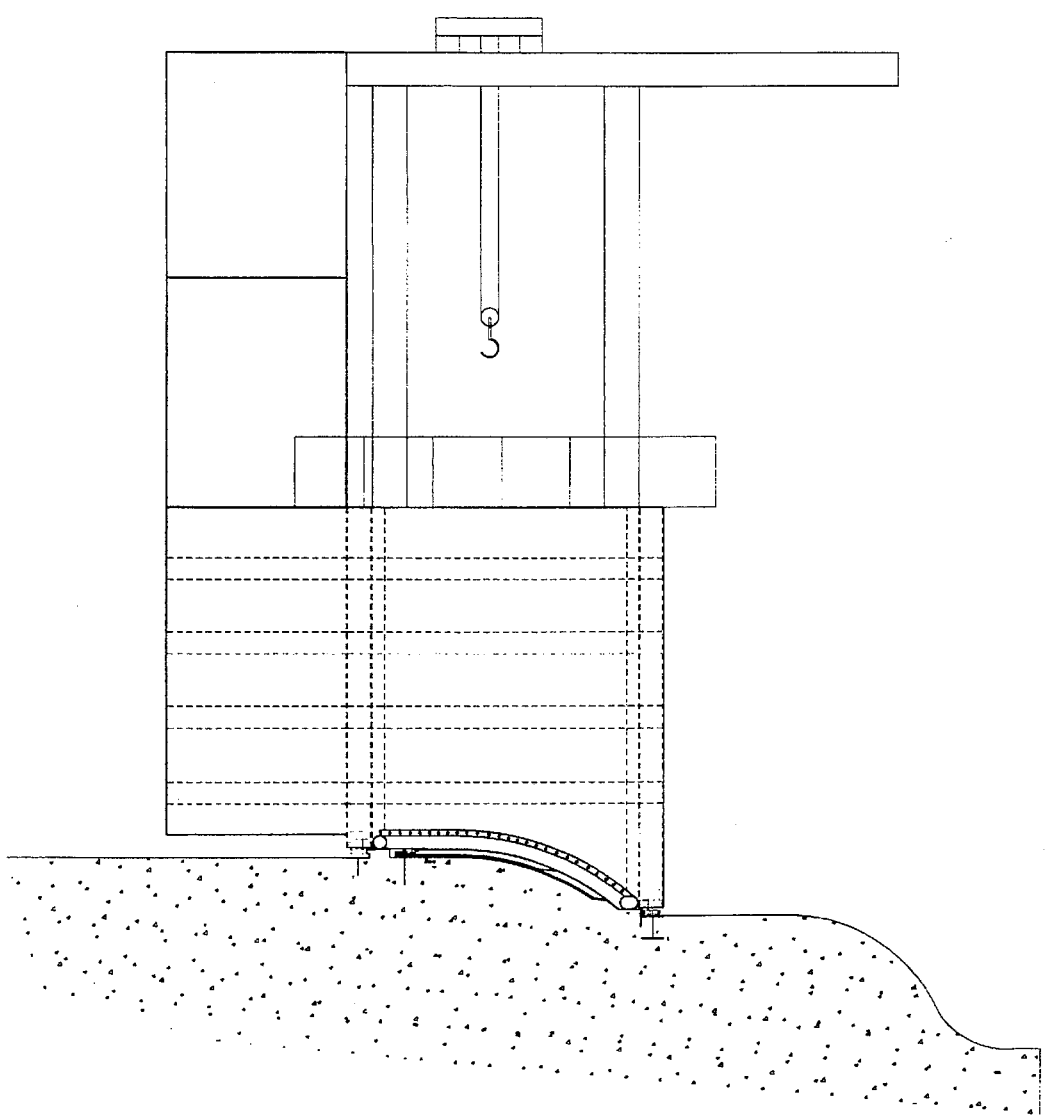
FIG. 14 is an overall elevation of the crane and spillway.

The contoured surfaces 20 of the cavities within the abutments 22a and 22b closely approximate the profile of the gates so that with the bulkheads 21a and 21b removed, the service crane 1 can straddel the outermost gates 23a and 23b. In another embodiment the service crane could be sized to service several gates simultaneously. The crane used to service the gates ocould be used to position the abutment bulkheads 21a and 21b. Alternatively one face of the service crane could be used as a seal surface for the adjacent gate. FIGS. 12 and 12a illustrates the position of the inflatable seal 6 relative to the gates 19.

Figure 15:
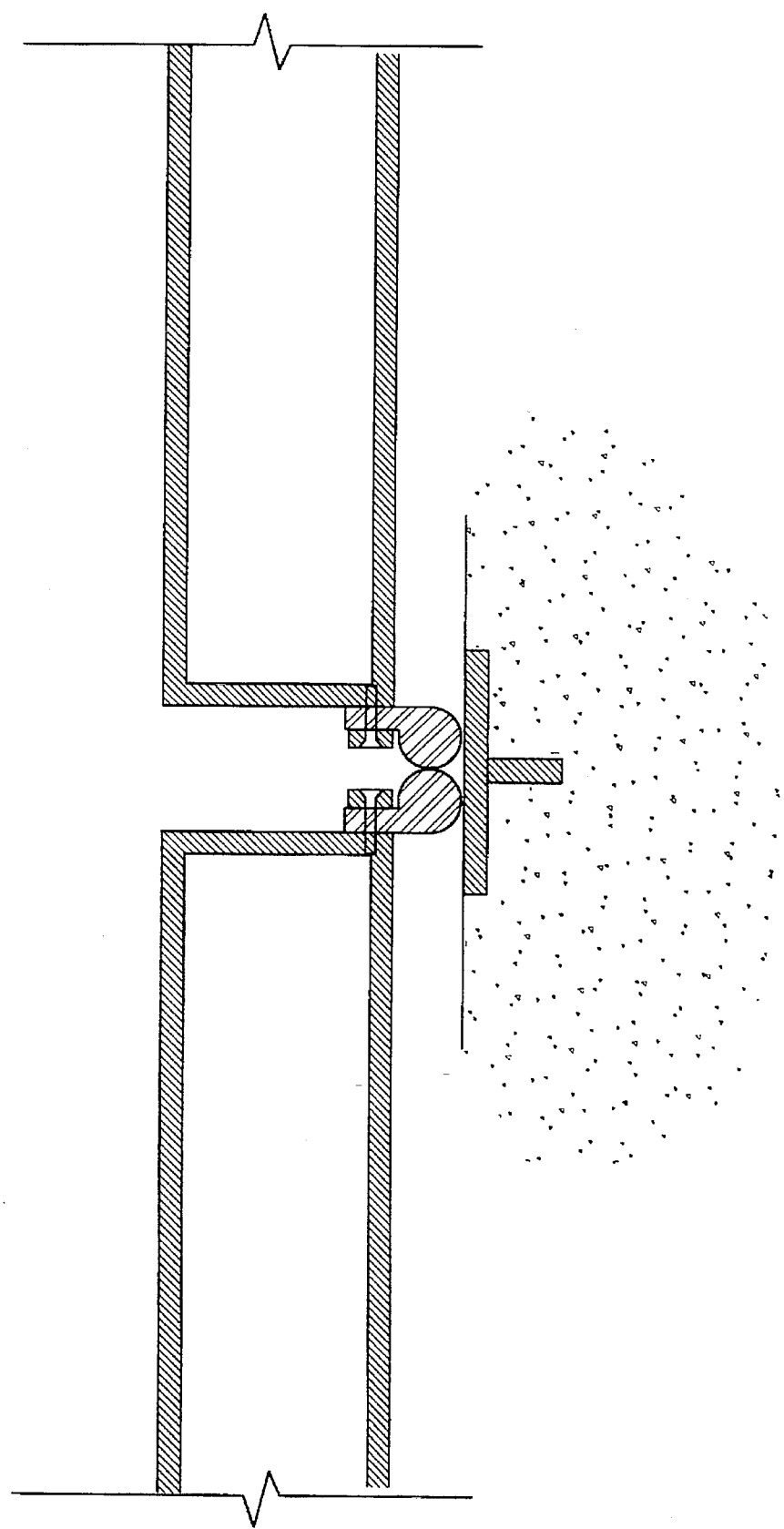
FIG. 15 is a sectional view of the seal assemblies which seal the adjacent gates to each other and also seal the gates to the spillway when lowered.

FIG. 13 illustartes an alternatve embodiment of the upstream and downstream craneways FIG. 15 illustrates a seal configuration which simultaneously seal adjacent gates to each other and to the spillway, sealing to the spillway being desirable in order to exclude leakage into the dewaterred caisson.

Figure 16:
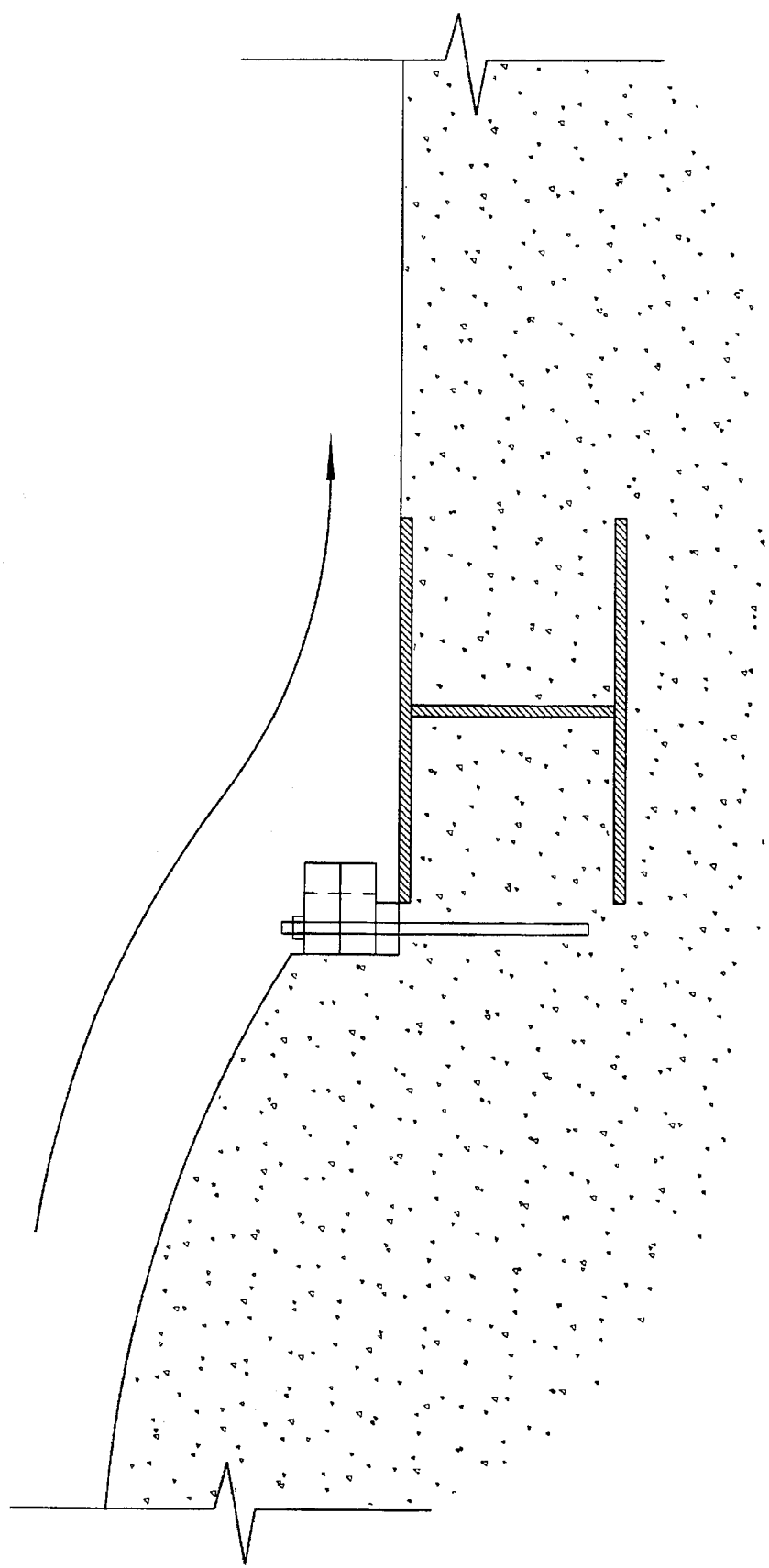
FIG. 16 is a detail of the downstream guide and rack assembly.

FIG. 16 illustrates the effect of flow on debris clearing from the rack.

Figure 17:
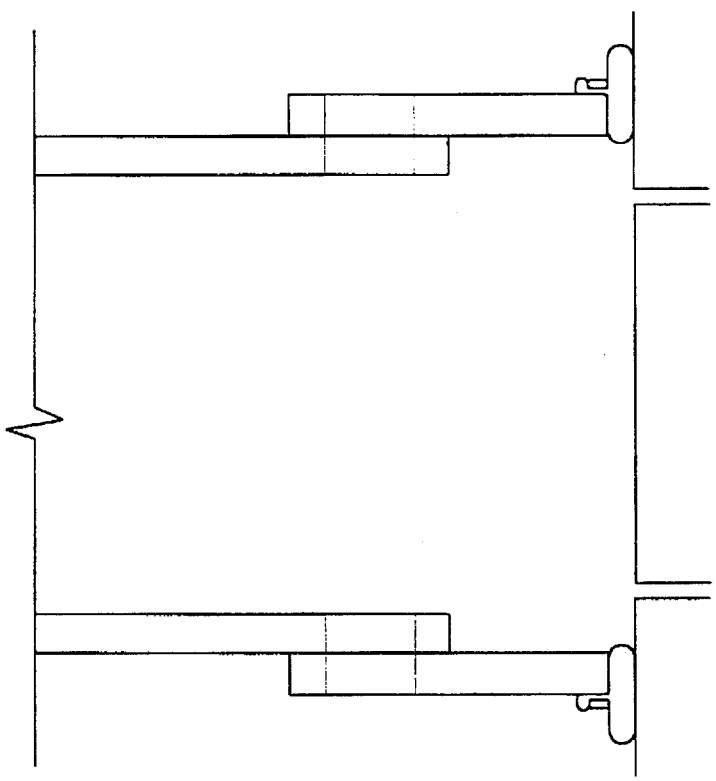
FIG. 17 is a sectional elevation of one embodiment of a movable caisson seal assemvly.

Alternative means of movably sealing to the gate panels is shown in FIG. 17.

Figure 18:
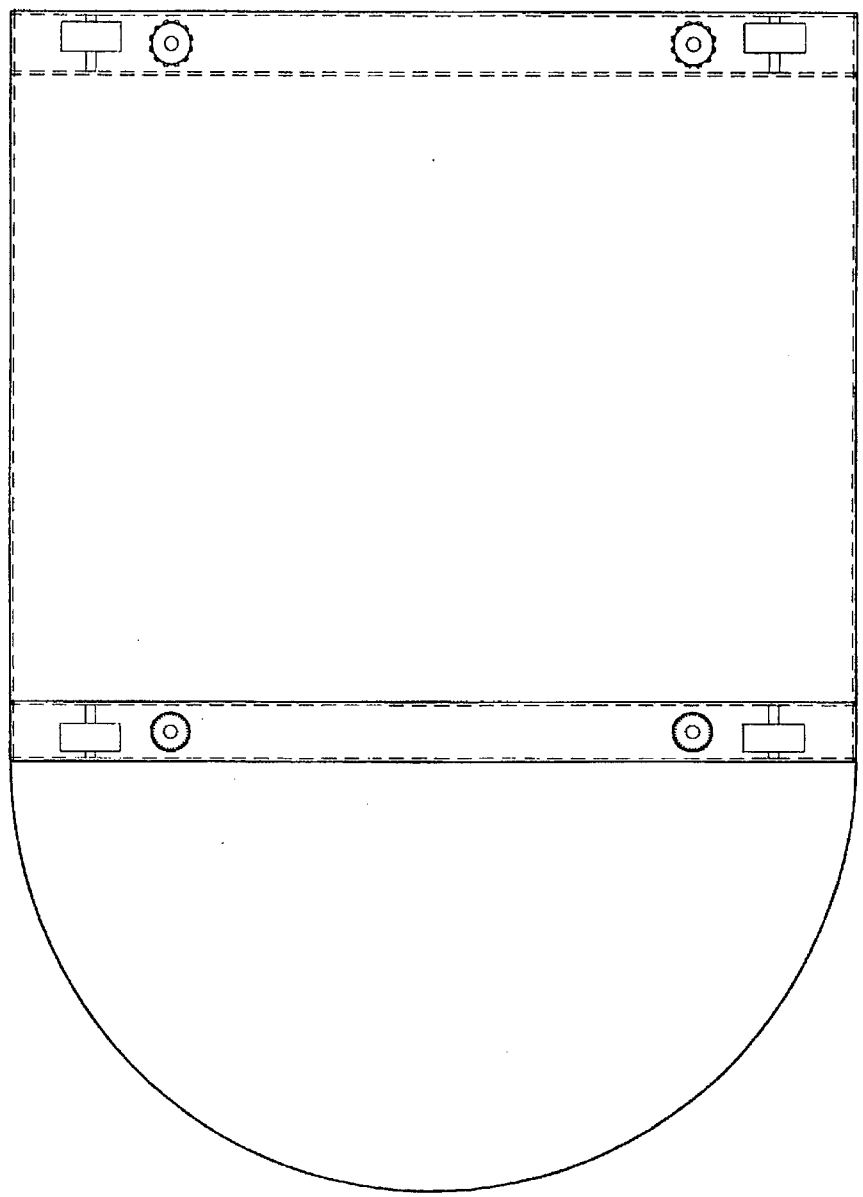
FIG. 18 is a plan view of a guide wheel and service crane drive pinion assembly.

FIG. 18 illustrates in one embodiment the relative position of the guide wheels 5, the drive pinions 11 and the other componants.

Figure 19:
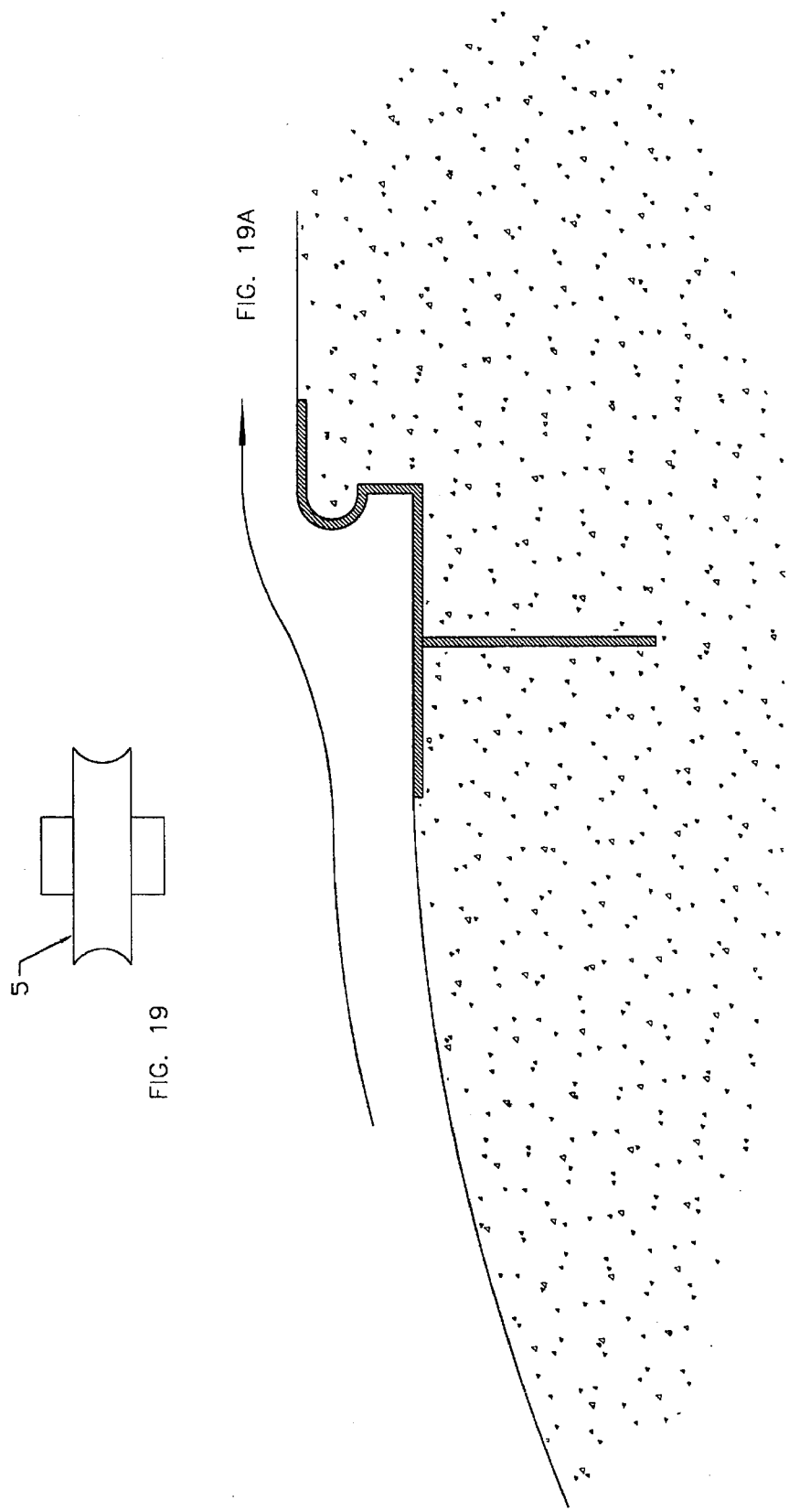
FIG. 19 is a sectional elevation of an upstream guide wheel.

FIG. 19 illustrates the preferred shape of the upstream guide wheel 5.

FIG. 19a illustrates the water flow path over the upstream guide rail. 17.

Figure 20:
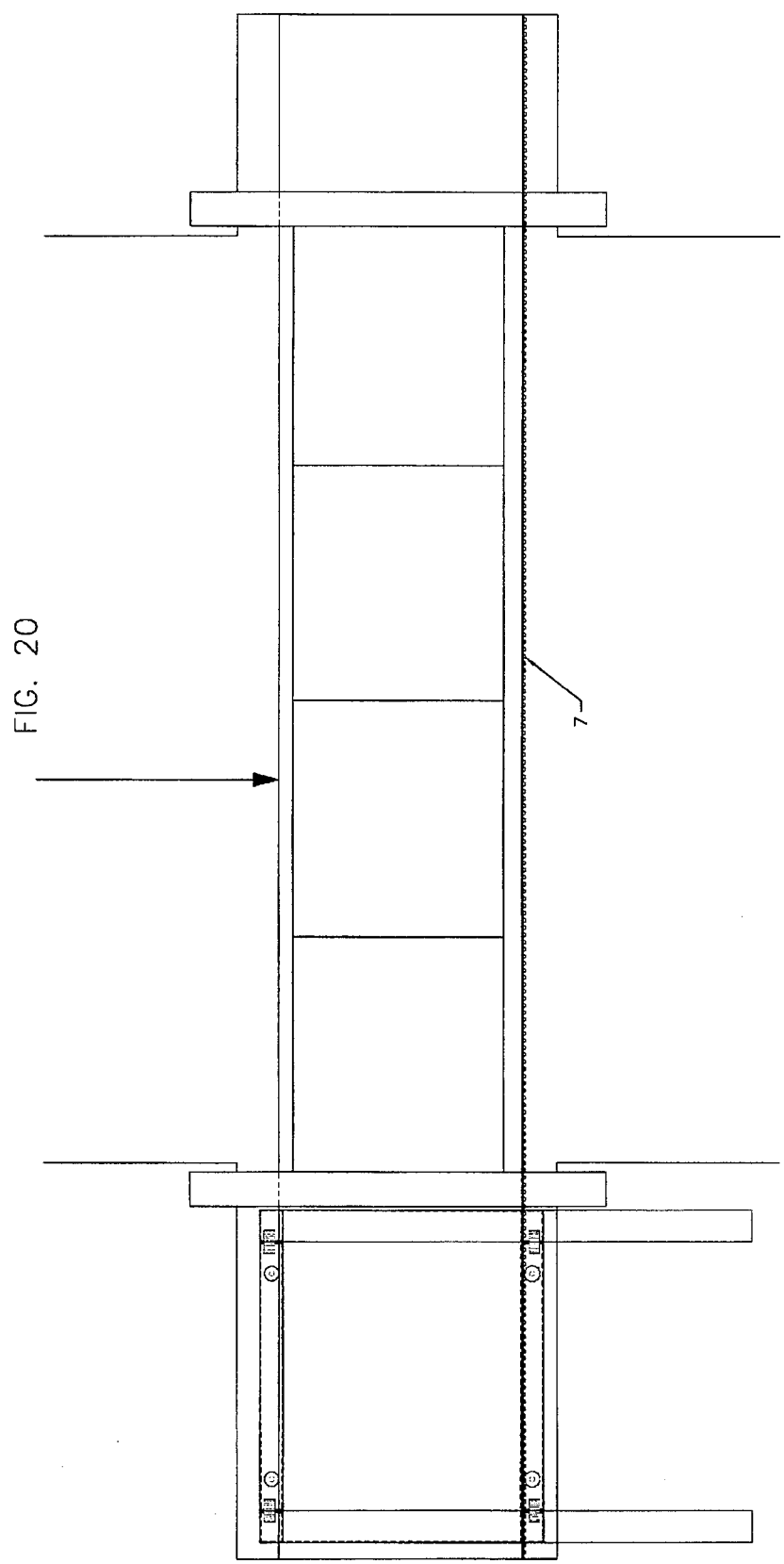
FIG. 20 is a plan view of the abutment recesses, the bulkheads, and the positioning rack.

FIG. 20 illustrates the relative position of the abutment recesses, the bulkheads and the positioning rack.

What is claimed is:

1. A spillway gate system comprising:
    (a) a spillway including abutments at opposite ends thereof; wherein at least one of said abutments includes a cavity therein having a bottom surface;
    (b) a removable bulkhead covering each said cavity in said abutment;
    (c) a plurality of water control gates hinged to said spillway;
    (d) a service crane movable along said spillway and including a dewatering caisson; and
    (e) means for sealing said caisson to said gates and to said bottom surface of said cavity.

2. A spillway in accordance with claim 1, wherein said caisson has upstream and downstream bottom edges which include support wheels.

3. A spillway in accordance with claim 2, wherein said spillway includes an upstream edge; and wherein said caisson includes a guide wheel for engaging said spillway upstream edge.

* * * * *